United States Patent [19]
Middleton

[11] Patent Number: 5,816,583
[45] Date of Patent: Oct. 6, 1998

[54] INTEGRAL LOCKING SLEEVE CHUCK

[75] Inventor: Ian Middleton, Sheffield, England

[73] Assignee: Power Tool Holders, Inc., Wilmington, Del.

[21] Appl. No.: 760,651

[22] Filed: Dec. 4, 1996

[51] Int. Cl.$^6$ ..................................................... B23B 31/12
[52] U.S. Cl. ............................................. 279/62; 279/902
[58] Field of Search ................................ 279/60–65, 902

[56] References Cited

U.S. PATENT DOCUMENTS

| | | |
|---|---|---|
| 573,189 | 12/1896 | Vogel . |
| 911,012 | 1/1909 | Jacobs . |
| 1,369,412 | 2/1921 | Englund . |
| 2,292,470 | 8/1942 | Ostberg . |
| 2,684,856 | 7/1954 | Stoner . |
| 3,702,705 | 11/1972 | Schadlich . |
| 3,807,745 | 4/1974 | Bent . |
| 3,949,998 | 4/1976 | Dietzen et al. . |
| 4,252,333 | 2/1981 | Vogel . |
| 4,275,893 | 6/1981 | Bilanceri . |
| 4,305,597 | 12/1981 | McCarty . |
| 4,423,881 | 1/1984 | Whitehead . |
| 4,660,841 | 4/1987 | Chouinard . |
| 4,840,387 | 6/1989 | McCarthy . |
| 4,951,955 | 8/1990 | Sakamaki . |
| 4,991,860 | 2/1991 | Rohm ........................................ 279/62 |
| 5,009,439 | 4/1991 | Sakamaki . |
| 5,145,192 | 9/1992 | Rohm . |
| 5,183,274 | 2/1993 | Sakamaki . |
| 5,193,824 | 3/1993 | Salpaka . |
| 5,348,317 | 9/1994 | Steadings et al. . |
| 5,348,318 | 9/1994 | Steadings et al. . |
| 5,431,419 | 7/1995 | Mack . |
| 5,458,345 | 10/1995 | Amyot . |
| 5,499,829 | 3/1996 | Rohm . |
| 5,499,830 | 3/1996 | Schnizler . |
| 5,501,473 | 3/1996 | Barton et al. . |
| 5,553,873 | 9/1996 | Salpaka et al. . |
| 5,580,197 | 12/1996 | Rohm . |
| 5,590,985 | 1/1997 | Mack . |
| 5,624,125 | 4/1997 | Rohm . |

FOREIGN PATENT DOCUMENTS

| | | |
|---|---|---|
| 0468128A1 | 1/1992 | European Pat. Off. . |
| 0618029A1 | 10/1994 | European Pat. Off. . |
| 0710519A2 | 4/1995 | European Pat. Off. . |
| 0710520A2 | 4/1995 | European Pat. Off. . |
| 0677348A1 | 10/1995 | European Pat. Off. . |
| 3411127A1 | 10/1985 | Germany . |
| 3434112A1 | 3/1986 | Germany . |
| 4023304C1 | 9/1991 | Germany . |
| 4238503C1 | 11/1993 | Germany . |
| 19506708C1 | 3/1996 | Germany . |
| 29600727U1 | 4/1996 | Germany . |
| 4438991A1 | 5/1996 | Germany . |
| 63-216604 | 9/1988 | Japan . |
| 4365504 | 12/1992 | Japan . |
| 1565048 | 4/1980 | United Kingdom . |
| 8903267 | 4/1989 | WIPO . |
| 9706912 | 2/1997 | WIPO . |

Primary Examiner—Steven C. Bishop
Attorney, Agent, or Firm—Dority & Manning, P.A.

[57] ABSTRACT

A chuck for use with a manual or powered driver having a rotatable drive shaft is provided. The chuck comprises a generally cylindrical body member. The body member has a forward section and a rearward section. The rearward section has an axial bore formed therein to mate with the drive shaft of the driver. A generally cylindrical sleeve is received over the forward section of the body. A primary retaining mechanism is in engagement with the sleeve and the body member to operatively prevent forward axial movement of the sleeve with respect to the body. A secondary retaining mechanism is attached to the sleeve so that if the primary retaining mechanism fails to prevent forward axial movement of the sleeve with respect to the body, the secondary retaining mechanism is brought to engagement with the body to prevent forward axial movement of the sleeve with respect to the body following the engagement.

30 Claims, 3 Drawing Sheets

INTEGRAL LOCKING SLEEVE CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a body member includes three passageways disposed approximately 120° apart from each other. The passageways are configured so that their center lines meet at a point along the chuck axis forward of the chuck. The passageways constrain three jaws which are movable in the passageways to grip a cylindrical tool shank displaced approximately along the chuck center axis. The chuck includes a nut which rotates about the chuck center and which engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. Such a chuck may be keyless if it is rotated by hand. One example of such a chuck is disclosed in U.S. Pat. No. 5,125,673 entitled "Non-impact Keyless Chuck," commonly assigned to the present assignee and the entire disclosure of which is incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide a chuck having a rotatable sleeve member and having a secondary retaining mechanism attached to the sleeve to prevent forward axial movement of the sleeve beyond the chuck body if the chuck fails.

These and other objects are achieved by providing a chuck for use with a manual or powered driver having a rotatable drive shaft. The chuck comprises a generally cylindrical body member having a forward section and a rearward section. The rearward section has an axial bore formed therein to mate with the drive shaft of the driver. A generally cylindrical sleeve is received over the forward section of the body. A primary retaining mechanism is in engagement with the sleeve and the body member to operatively prevent forward axial movement of the sleeve with respect to the body. A secondary retaining mechanism is attached to the sleeve so that if the primary retaining mechanism fails to prevent forward axial movement of the sleeve with respect to the body, the secondary retaining mechanism is brought to engagement with the body to prevent forward axial movement of the sleeve with respect to the body following the engagement.

In a preferred embodiment, the forward section of the body includes an annular ledge about its outer surface. The secondary retaining mechanism includes a lip section extending radially inward from the sleeve to within the outer diameter of the annular ledge. The lip is constructed so that it is resilient in one direction but rigid in another. Thus, in a preferred embodiment, the lip extends radially inward and axially forward with respect to the chuck body. When the sleeve is mounted onto the chuck, the sloping rear face of the lip is pulled over the ledge, causing the lip to radially deform and pass over the ledge.

When the sleeve is in its operative position on the body, the lip is axially forward of, and does not engage, the ledge. The sleeve is operatively maintained in position with respect to the body member by the primary retaining mechanism. In one preferred embodiment, the chuck includes a nut maintained in position on the body by a retaining cone pressed onto the body. The sleeve is attached to the nut, for example, by a press fit. Thus, the primary retaining mechanism includes the retaining cone and the nut.

While the chuck remains in an operative condition, the retaining cone and the nut maintain the sleeve in position with respect to the body. Under such conditions, the front lip does not engage the ledge. Should the chuck fail, however, such that some disengagement occurs among the sleeve, the nut, the retaining cone and/or the body and such that the sleeve moves axially forward, the front lip engages the ledge to hold the sleeve in position proximate the body. Thus, such construction can prevent the sleeve from completely separating from the chuck if the chuck fails while rotating at a high rate.

Other objects, features, and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
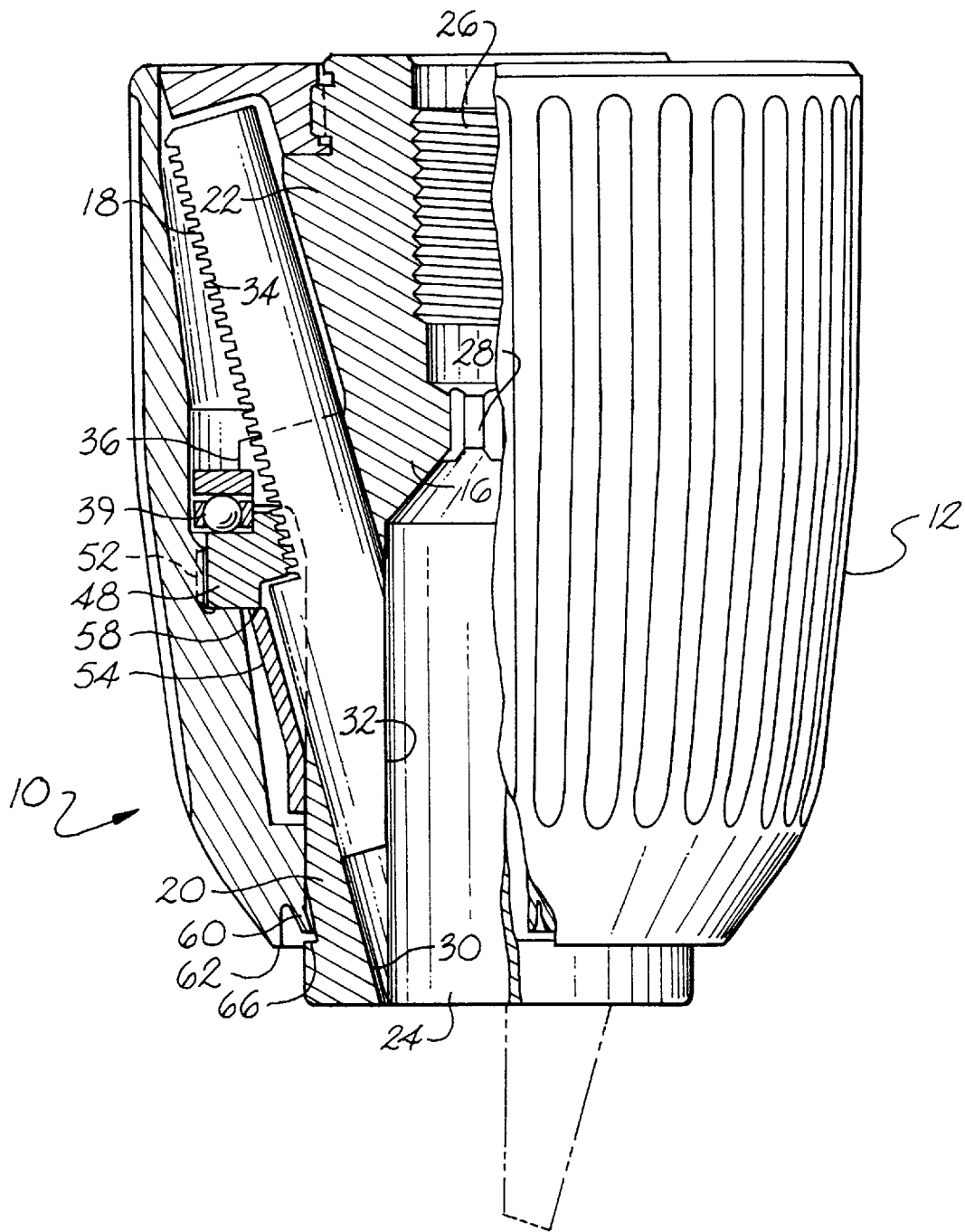
FIG. 1 is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments to the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modification and variations as come within the scope of the appended claims and their equivalents.

Figure 3:
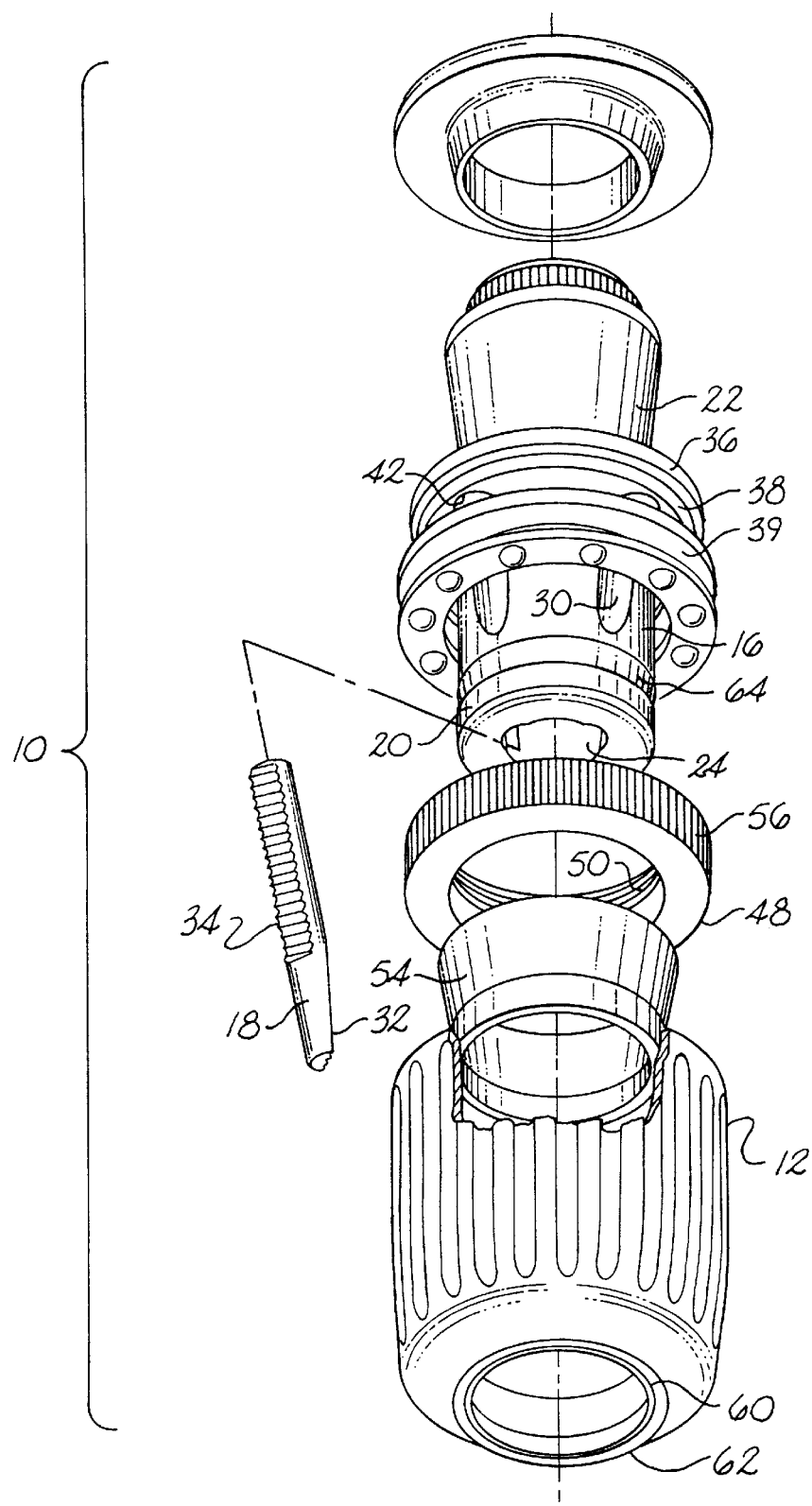
FIG. 3 is an exploded view of a chuck in accordance with the embodiment as in FIG. 1.

Referring to a preferred embodiment illustrated in FIGS. 1 and 3, a chuck 10 in accordance with the present invention is illustrated. Chuck 10 includes a sleeve member 12, a body member 16 and jaws 18. Body member 16 is generally cylindrical in shape and comprises a nose or forward section 20 and a tail or rearward section 22. An axial bore 24 is formed in the nose section 20. Axial bore 24 is dimensioned somewhat larger than the largest tool shank that the chuck is designed to accommodate. A threaded bore 26 is formed in tail section 22 and is of a standard size to mate with the drive shaft of a powered or hand driver (not shown). The bores 24, 26 may communicate at a central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Three jaws 18 are employed, and each jaw is separated from the adjacent jaw by an arc of approximately 120°. The axes of the passageways 30 and the jaws 18 are angled with respect to the chuck axis and intersect the chuck axis at a common point ahead of the chuck body 16. Each jaw 18 has a tool engaging face 32, which is generally parallel to the axis of the chuck body 16, and threads 34 on its opposite or outer surface. Threads 34 may be constructed in any suitable type and pitch.

As illustrated in FIGS. 1 and 3, body member 16 includes a thrust ring member 36 which, in a preferred embodiment, may be integral with the body. In an alternate embodiment, thrust ring 36 may be a separate component from the body member. Thrust ring 36 may also include a ledge portion 38 to receive a bearing assembly 39. Thrust ring 36 includes a plurality of jaw guideways 42 formed around the circumference to permit retraction of the jaws 18 therethrough.

Figure 2:
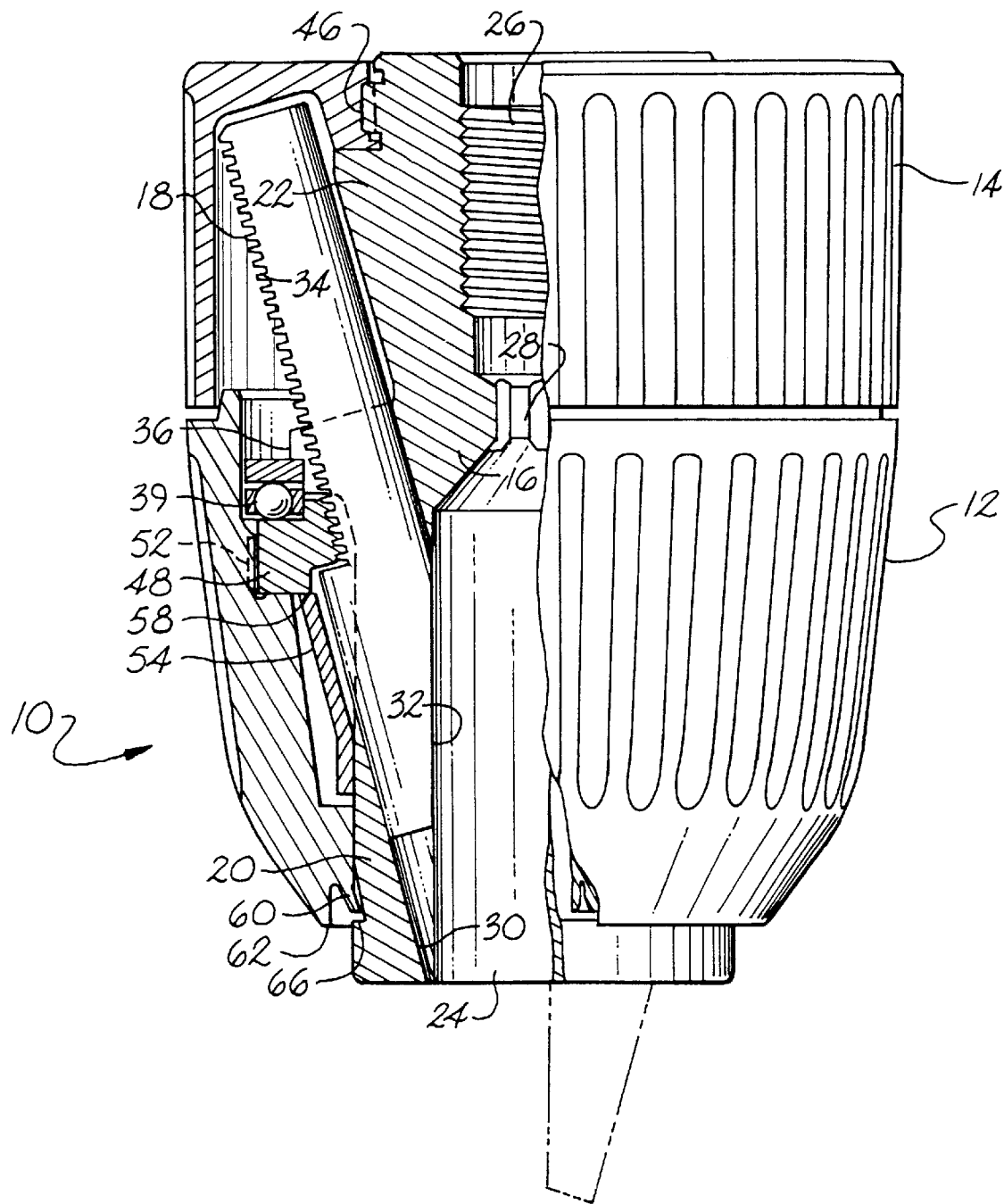
FIG. 2 is a longitudinal view, partly in section, of a chuck in accordance with an embodiment of the present invention.

In a preferred embodiment illustrated in FIG. 2, body member 16 includes a rear cylindrical portion 22 with a knurled surface 26 for receipt of an optional rear sleeve 14 to be pressed thereon if so desired. It should be appreciated that rear sleeve 14 could also be retained in place by press fit without knurling, or by use of a key. It could also be retained in place by crimping, staking, riveting, threading or any other suitable securing mechanism.

Referring again to FIGS. 1 and 3, chuck 10 includes a nut 48 which, in a preferred embodiment, is a one piece nut and which includes threads 50 for mating with threads 34 on jaws 18. Nut 48 is positioned about the body in engagement with the jaw threads so that when the nut is rotated with respect to body 16, the jaws will be advanced or retracted. The outer surface of nut 48 may be knurled so that the nut may be press fit to sleeve 12 at 52 so that when sleeve 12 is rotated, nut 48 will rotate therewith to move the jaws.

The outer circumferential surface of sleeve 12 may be knurled or may be provided with longitudinal ribs or other protrusions to enable the operator to grip it securely. In like manner, the circumferential surface of a rear sleeve 14 (FIG. 2), if employed, may be knurled or ribbed if desired. The front and rear sleeves may be fabricated from a structural plastic such as polycarbonate, a filled polypropylene, for example glass filled polypropylene, or a blend of structural plastic materials. Other composite materials such as, for example, graphite filled polymerics would also be suitable in certain environments. As would be appreciated by one skilled in the art, the materials for which the chuck of the present invention is fabricated will depend on the end use of the chuck, and the above are provided by way of example only.

It should be appreciated that rear sleeve member 14 (FIG. 2) is fixed to body 16 while front sleeve member 12 is operatively associated with nut 48 and axially secured with respect to the body to permit rotation with respect to the body. Relative movement of the front and rear sleeve members 12 and 14, due to the interaction between threads 34 on jaws 18 and threads 50 on nut 48, causes jaws 18 to be advanced or retracted, depending upon the direction of relative movement.

As indicated above, rear sleeve 14 (FIG. 2) is secured to body 16 by the press fit at 46. Front sleeve 12, as illustrated in FIGS. 1–3, is axially secured with respect to the body by nut 48 and retaining ring 54. As described above, sleeve 12 is pressed to nut 48 at 52. In one preferred embodiment, nut 48 includes a ribbed surface 56 which is pressed into sleeve 12. Retaining ring 54 is an annular cone that is pressed onto front section 20 of body 16 and that engages nut 48 at 58. Thus, cone 54 and nut 48 secure sleeve 12 in the axial direction with respect to the body. In an operative condition, they prevent forward axial movement of the sleeve.

If chuck 10 fails, however, so that cone 54 and/or nut 48 fail to prevent forward axial movement of the sleeve, a secondary retaining mechanism retains sleeve 12 proximately about body 16.

In the embodiments depicted in the figures, the secondary retaining mechanism comprises an annular lip 60 proximate the open end 62 of sleeve 12. Lip 60 extends radially inward from sleeve 12 and axially forward toward open end 62. As shown, lip 60 may be unitarily constructed with sleeve 12. The diameter of the opening defined by lip 60 is smaller than the outer diameter of front section 20 of body 16. As the sleeve is mounted onto the body, however, the forward orientation of lip 60 allows the lip to deform as front section 20 contacts the sloped inner or rearward face of the lip. A groove 64 is formed in front section 20 to receive lip 60 when sleeve 12 is secured to the body in its operative position. Groove 64 forms a ledge 66 which opposes lip 60 when the sleeve is in its operative position.

When sleeve 12 is in its operative position, lip 60 does not engage ledge 66. If the chuck should fail, however, and if sleeve 12 moves axially forward with respect to the body, lip 60 engages ledge 66 to retain sleeve 12 in a position about the body.

Ledge 66 may be constructed in a number of configurations. For example, it might not necessarily extend completely around the body, possibly defining intermittent gaps. In addition, it is not necessary that it be constructed from a part of the body.

While an oblique-jawed chuck driven by a nut is illustrated, it should be understood that the construction of the present invention may be used in any suitable type of chuck. Furthermore, in another nut-driven design, a split nut construction may be employed. For example, the split nut may be received in a groove formed in the body and held together by a band about its outer circumference or by the sleeve. The sleeve member may be pressed to the band, or secured to the nut or otherwise to the body by other suitable mechanisms. Moreover, it should be understood that all suitable mechanisms for securing the sleeve to the body in an operative condition are encompassed by the present invention.

While the above description is set forth with respect to a keyless chuck, it should be appreciated that many of the principles of the present invention are equally applicable to a keyed chuck, and such is within the scope of the present invention.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed:

1. A chuck for use with a manual or powered driver having a rotatable drive shaft, said chuck comprising:
   a generally cylindrical body member, said body member having a forward section and a rearward section, said rearward section having an axial bore formed therein to mate with said drive shaft of said driver;
   a generally cylindrical sleeve being received over said forward section of said body;
   a primary retaining mechanism in engagement with said sleeve and said body member to operatively prevent forward axial movement of said sleeve with respect to said body; and
   a secondary retaining mechanism attached to said sleeve so that if said primary retaining mechanism fails to prevent forward axial movement of said sleeve with respect to said body, said secondary retaining mechanism is brought to engagement with said body to prevent forward axial movement of said sleeve with respect to said body following said engagement.

2. The chuck as in claim 1, wherein said body includes an annular ledge about an outer surface of said body, and wherein said sleeve includes a lip section extending radially inward from said sleeve to within the outer diameter of said annular ledge so that at least a portion of said lip section opposes said annular ledge axially with respect to said body, said primary retaining mechanism being in engagement with said sleeve and said body to operatively prevent forward axial movement of said sleeve with respect to said body so that said lip section remains rearward of, and does not engage, said annular ledge.

3. The chuck as in claim 2, wherein said annular ledge and said body are of a unitary construction.

4. The chuck as in claim 2, wherein said annular ledge is included on said forward section of said body member.

5. The chuck as in claim 2, wherein said sleeve has an annular open forward end and wherein said lip section extends from said sleeve proximate said annular open forward end axially toward said annular open forward end.

6. The chuck as in claim 2, wherein said lip section forms an annular lip.

7. The chuck as in claim 5, wherein said lip section extends annularly entirely about an inner circumference of said sleeve member to form a frustoconical lip.

8. The chuck as in claim 2, wherein said lip section is resilient in a radial direction with respect to said body.

9. The chuck as in claim 2, wherein said lip section and said sleeve are of a unitary construction.

10. The chuck as in claim 1 and further including a rear sleeve received on the rearward section of said body.

11. The chuck as in claim 1, wherein said primary retaining mechanism includes a press fit between said primary retaining mechanism and at least one of said sleeve and said body.

12. The chuck as in claim 1, wherein said secondary retaining mechanism and said sleeve are of a unitary construction.

13. A chuck for use with a manual or powered driver having a rotatable drive shaft, said chuck comprising:
   a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;
   a plurality of jaws slidably positioned in each of said angularly disposed passageways, each of said jaws having a jaw face formed on one side thereof and threads formed on the opposite side thereof;
   a nut rotatably mounted relative to said body so as to engage said jaw threads;
   a generally cylindrical sleeve having an annular open forward end, said sleeve being received over the forward section of said body for engaging said nut so that when said sleeve member is rotated, said nut will be rotated therewith to operate said jaws;
   a primary retaining mechanism in engagement with said sleeve and said body member to operatively prevent forward axial movement of said sleeve with respect to said body; and
   a secondary retaining mechanism attached to said sleeve so that if said primary retaining mechanism fails to prevent forward axial movement of said sleeve with respect to said body, said secondary retaining mechanism is brought to engagement with said body to prevent forward axial movement of said sleeve with respect to said body following said engagement.

14. The chuck as in claim 13, wherein said body includes an annular ledge about an outer surface of said body, and wherein said sleeve includes a lip section extending radially inward from said sleeve to within the outer diameter of said annular ledge surface so that at least a portion of said lip section opposes said annular ledge axially with respect to said body, said primary retaining mechanism being in engagement with said sleeve and said body to operatively prevent forward axial movement of said sleeve with respect to said body so that said lip section remains rearward of, and does not engage, said annular ledge.

15. The chuck as in claim 14, wherein said lip section extends from said sleeve proximate said annular open forward end axially toward said annular open forward end.

16. The chuck as in claim 13, wherein said lip section forms an annular lip.

17. The chuck as in claim 15, wherein said lip section extends annularly entirely about an inner circumference of said sleeve to form a frustoconical lip.

18. The chuck as in claim 14, wherein said lip section is resilient in a radial direction with respect to said body.

19. The chuck as in claim 14, wherein said primary retaining mechanism includes said nut.

20. The chuck as in claim 19, wherein said nut is disposed in engagement with said body so that forward axial movement of said nut with respect to said body is operatively prevented and wherein said sleeve is axially secured to said nut.

21. The chuck as in claim 20, wherein said nut is a unitary nut and wherein said retaining mechanism includes an annular retaining member located on said body so as to contact a portion of said unitary nut to operatively prevent axial movement of said unitary nut in the forward direction.

22. The chuck as in claim 20, wherein said sleeve member engages said nut by a press fit.

23. The chuck as in claim 14, wherein said lip section and said sleeve are of a unitary construction.

24. The chuck as in claim 21, wherein said annular retaining member is received in a groove in said forward section of said body.

25. The chuck as in claim 14, including a bearing thrust ring located on said body and at least one anti-friction bearing disposed between said nut and said thrust ring.

26. A chuck for use with a manual or powered driver having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a unitary nut rotatably mounted relative to said body so as to engage said jaw threads;

a generally cylindrical sleeve having an annular open forward end, said sleeve being received over the forward section of said body for engaging said nut so that when said sleeve member is rotated, said nut will be rotated therewith to operate said jaws and so that said sleeve is fixed in the axially forward direction with respect to said nut;

an annular retaining member pressed to said body forward of said nut and in engagement therewith to operatively prevent forward axial movement of said sleeve with respect to said body; and a secondary retaining mechanism attached to said sleeve so that if at least one of said nut and said annular retaining member fails to prevent forward axial movement of said sleeve with respect to said body, said secondary retaining mechanism is brought to engagement with said body to prevent forward axial movement of said sleeve with respect to said body following said engagement.

27. The chuck as in claim 26, wherein said body includes an annular ledge about an outer surface of said body, and wherein said sleeve includes a lip section extending radially inward from said sleeve to within the outer diameter of said annular ledge surface so that at least a portion of said lip section opposes said annular ledge axially with respect to said body, said annular retaining member and said nut being in engagement with said sleeve and said body to operatively prevent forward axial movement of said sleeve with respect to said body so that said lip section remains rearward of, and does not engage, said annular ledge.

28. The chuck as in claim 26, wherein said sleeve member engages said nut by a press fit.

29. The chuck as in claim 27, wherein said lip section and said sleeve are of a unitary construction.

30. The chuck as in claim 27, including a bearing thrust ring located on said body.

* * * * *